CYLINDRICAL MAGNETIC FILM STORAGE APPARATUS

Filed Dec. 7, 1965 2 Sheets-Sheet 1

United States Patent Office 3,470,544
Patented Sept. 30, 1969

3,470,544
CYLINDRICAL MAGNETIC FILM STORAGE APPARATUS

David C. Stapleton, Milton Malsor, England, assignor to The Plessey Company Limited, Ilford, England, a British company Filed Dec. 7, 1965, Ser. No. 512,153
Claims priority, application Great Britain, Dec. 7, 1964, 49,628/64
Int. Cl. G11c 11/06, 5/08
U.S. Cl. 340—174 4 Claims

ABSTRACT OF THE DISCLOSURE

Magnetic storage apparatus comprising a plurality of magnetic storage elements arranged in rows and columns, each including a tubular film of isotropic rectangular hysteresis loop material, a set of first conductors, one associated with each row and extending lengthwise through the tubular films of said row, and a set of second conductors, one associated with each column and extending lengthwise through the tubular films of said column, so that energisation of a first conductor and a second conductor produces in the tubular films of the respective row and column a circumferential magnetising field, and a set of third conductors, each having a portion in close proximity to the exterior of each tubular film so that energisation of a third conductor produces in each tubular film a magnetising field in a direction lengthwise of said tubular films.

This invention relates to magnetic storage arrangements and relates more specifically to such arrangements of the so-called "two co-ordinate" kind, that is to say, magnetic storage arrangements in which for the purpose of reading out information two control conductors of the storage arrangement carry appropriate currents whilst for reading in, the energisation of three control conductors of the arrangement needs to be provided for.

Hitherto, magnetic storage arrangements of the kind specified have employed ferrite cores of toroidal configuration but for certain applications where space considerations are important it would be advantageous to employ thin film magnetic storage techniques. Such techniques have already been used successfully for so-called "word organised" magnetic storage arrangements in which magnetic material exhibiting an anisotropic rectangular hysteresis loop is utilised as the storage medium.

The present invention has in view the provision of thin-film magnetic storage apparatus in or for "two co-ordinate organised" magnetic storage arrangements as hereinbefore defined.

According to the invention as broadly conceived, thin-film magnetic storage apparatus in or for "two co-ordinate organised" arrangements comprises a magnetic storage element including a film of isotropic, rectangular hysteresis loop material, first and second conductors extending in the same direction in close proximity to the film and energisable for producing in said film a magnetising field in a direction transverse to the direction of said conductors, and a third conductor in close proximity to the film arranged so that when energised it products in said film a magnetising field in a direction transverse to the direction of the field produced by the said first and second conductors.

The film of isotropic material may be of tubular configuration, preferably cylindrical, in which event the two conductors referred to above will extend axially relatively to the tubular film so that these conductors when energised produce a circumferential or equivalent magnetising field in the film according to its configuration. The said further conductor will be arranged for producing in the film an axial magnetising field consequent upon the energisation of said further conductor.

The cylindrical film of magnetic material may be deposited on to a cylindrical former of suitable insulating material (e.g. glass) in which case the film may be deposited by the evaporation or chemical deposition of the thin film material (e.g. nickel-iron alloy) on to the former. If the cylindrical former is composed of electrically conducting material (e.g. copper) then the magnetic film may be deposited by electroplating said former as an alternative to evaporation.

In applying apparatus according to the present invention to "two co-ordinate organised" arrangements the two conductors for producing the circumferential magnetising field constitute so-called "word" conductors and one cylindrical magnetic storage element and associated "word" conductors will be provided in respect of each "word" to be stored by the storage arrangement. The further conductor associated with each of the storage elements constitutes a so-called "digit" conductor and a number of such conductors extending orthogonally relatively to the axis of each of the cylindrical elements with which they are associated may be provided according to the number of "digits" to be contained in each of the "words." The "word" conductors of the assembly of cylindrical film elements may be suitably interconnected to define two groups of "word" conductors but any two "word" conductors are only operatively associated with any one cylindrical film by having adjacent portions thereof extending axially through said film. The "digit" conductor(s) on the other hand may each be associated with all of the cylindrical film elements of the arrangement.

With magnetic storage arrangements incorporating apparatus according to the invention, a binary "word" may be written into the store defined by an array of cylindrical film elements and associated conductors, each element being capable of storing a plurality of digits along its length (i.e. one digit per digit conductor) by applying appropriate writing current pulses contemporaneously to "digit" conductors and two "word" conductors operatively associated with the cylindrical film element appertaining to the "word" to be stored. In order to read out a binary word from such storage arrangements appropriate reading current pulses may be applied contemporaneously to a selected pair of "word" conductors so that the pulses occurring together reverse the magnetic state of magnetisation of the storage elements of the cylindrical film and so produce outputs from "digit" conductors associated with said film.

For a better understanding of the invention reference will now be made to the accompanying drawings in which.

Figure 1:
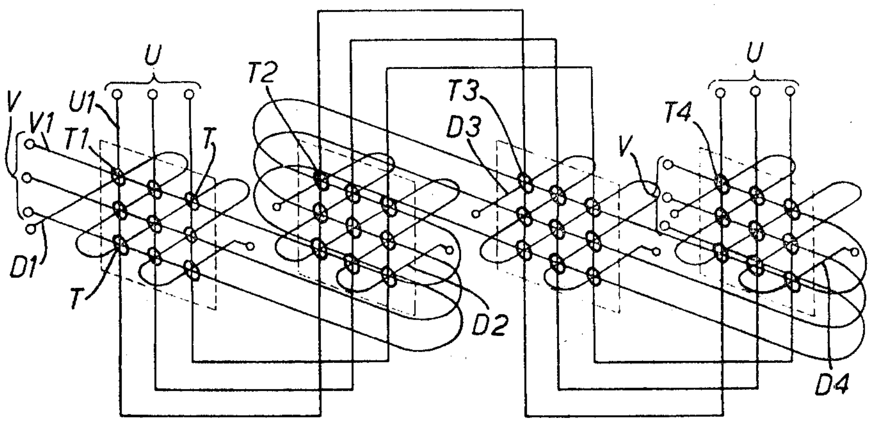
FIG. 1. PRIOR ART
FIGURE 1 is a diagrammatic representation of known magnetic storage apparatus of a "two co-ordinate organised" magnetic storage arrangement.
Figure 2:
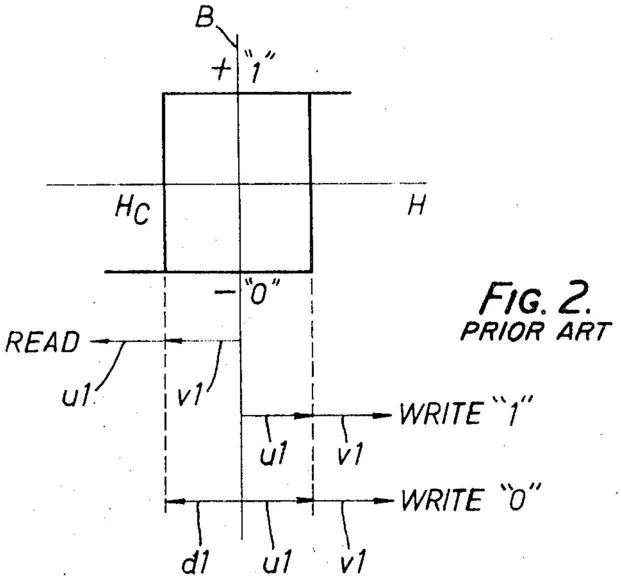
FIG. 2. PRIOR ART
FIGURE 2 is a diagram depicting the effect of reading and writing currents on the hysteresis loop of ferrite magnetic cores of the apparatus according to FIGURE 1.

Referring firstly to FIGURES 1 and 2 of the drawings, FIGURE 1 is a diagrammatic representation of a known form of magnetic storage apparatus of a "two co-ordinate organised" arrangement employing ferrite toroidal cores having square hysteresis loops as magnetic storage elements. The apparatus illustrated comprises two groups of orthogonally arranged "word" conductors U and V respectively. These conductors, such as the conductors V1 and U1, link with toroidal cores T, such as the core T1. For the purpose of simplifying the drawing, when two "word" conductors link with the same core they are depicted as intersecting within the core. In the example taken there are four sets of nine such intersections between "word" conductors. The ferrite cores appertaining to the sets of intersections are also threaded by respective digit conductors D1, D2, D3 and D4 as shown. By considering the diagram, it will readily be apparent that four ferrite cores—one from each set of cores—can be selected by the energisation of an appropriate pair of "word" conductors respectively from the groups U and V. For instance, selection of the "word" conductors U1 and V1 selects the cores T1, T2, T3 and T4. These selected cores define a magnetic "word" store appertaining to the "word" conductors U1 and V1. In all, the storage of nine discrete magnetic words is catered for by the apparatus illustrated. The digit conductors D1 to D4 are operatively associated with each of the groups of "word" cores by threading the respective cores, such as the cores T1 to T4. Consequently each "word" is capable of containing four digits or "bits" of data. These digits comprises binary digital information in which the 0's and 1's are stored as the negative and positive remanent states of magnetisation, respectively, of the ferrite cores appertaining to the digits.

In operation of the arrangement, currents are selectively applied to pairs of "word" conductors taken one from each of groups U and V. It is arranged that the current applied to each of the "word" conductors of the pair is not itself sufficient to exceed the coercivity of the hysteresis loop of a storage core. However, coincidence between the currents in "word" conductors linking the same core will overcome the coercive force of the core and thus bring about a change in its magnetisation.

For the purpose of reading out information or writing information into the store, the appropriate "word" conductors will be selectively energised in any convenient manner. By referring to FIGURE 2 which shows the hysteresis loop of one of the cores, it can be seen that for reading out information negative currents *u1* and *v1* will be applied to the appropriate word conductors (e.g. U1 and V1). As hereinbefore mentioned, the toroidal core will have a positive remanence when storing digit "1" or a negative remanence when storing digit "0." Consequently if digit "1" is stored in core T1 say while currents flow contemporaneously in "word" conductors U1 and V1 say, the core T1 will become re-magnetised in the negative direction. This change in magnetisation will produce an output in the digit conductor, D1 say, linking the core. Should digit "0" be stored then the negative polarity of magnetisation of the core will remain unchanged in the presence of the currents U1 and V1 so that no output appears on the digit conductors. Thus digit conductors D1 to D4 will have applied to them an output pattern indicative of the content of the stored "word."

In the case of writing binary information into the store, the sense of the currents in the selected "word" conductors is reversed as shown in FIGURE 2. This is sufficient to take the core into a condition of positive remanence in order to store digit "1." Digit "0" may be stored in the core by applying negative current *d1* to the appropriate digit conductor to prevent reversal of the magnetisation of the core. Thus it will be seen that "words" may be written into the store by applying negative current to selected digit conductors in the presence of appropriate positive currents in the word conductors.

Having described one known "two co-ordinate organised" magnetic storage arrangement, reference will now be made to FIGURE 3 which shows an exemplary storage arrangement according to the present invention. This storage arrangement is broadly equivalent to that shown in FIGURE 1 but as shown only provides for the storage of two bits of information or digits per "word." It will be obvious that the number of digit conductors and thus the digits per word can readily be increased.

In this arrangement the magnetic storage media, instead of ferrite cores takes the form of cylindrical thin film elements F1 to F9 formed of isotropic magnetic material having a rectangular hysteresis loop characteristic.

Each of the cylindrical film elements F1 to F9 is capable of providing storage for one "word," and in the embodiment illustrated each "word" has two digits. The nine elements F1 to F9 are arranged as shown in an array of rows and columns, three elements in each row, and three elements in each column; however more rows and columns can of course be provided, depending upon the storage capacity required. All of the nine elements F1 to F9 are associated with two digit conductors D1 and D2 each of which are arranged to lie in close proximity with the exteriors of the cylindrical elements F1 to F9, orthogonally with respect to the axes of said elements. The two digit conductors D1 and D2 are spaced apart lengthwise of the nine elements F1 to F9. Although only two digit conductors are shown in this embodiment, any convenient number may be provided depending upon the number of digit storage positions required in each "word."

Two sets of "word" conductors, U and V respectively, are also provided and as shown the conductors U are each common to a row of elements, whilst the conductors V are each common to a column of elements. Thus in this embodiment there are three conductors U and three conductors V. The conductors U and V are arranged to pass lengthwise through the respective cylindrical film elements F1 to F9, and it will be apparent from FIGURE 3 that each film element is associated with a unique pair of onductors U and V. Thus in the case of the element indicated by reference F7, this is associated with "word" conconductors U and V. Thus in the case of the element indiductors U1 and V1, and although each of the conductors U1 and V1 is associated with other elements, no other element is associated with both of the conductors U1 and V1. The cylindrical film elements can thus be considered as being located at the respective intersections of a 3 x 3 selecting matrix.

Figure 3:
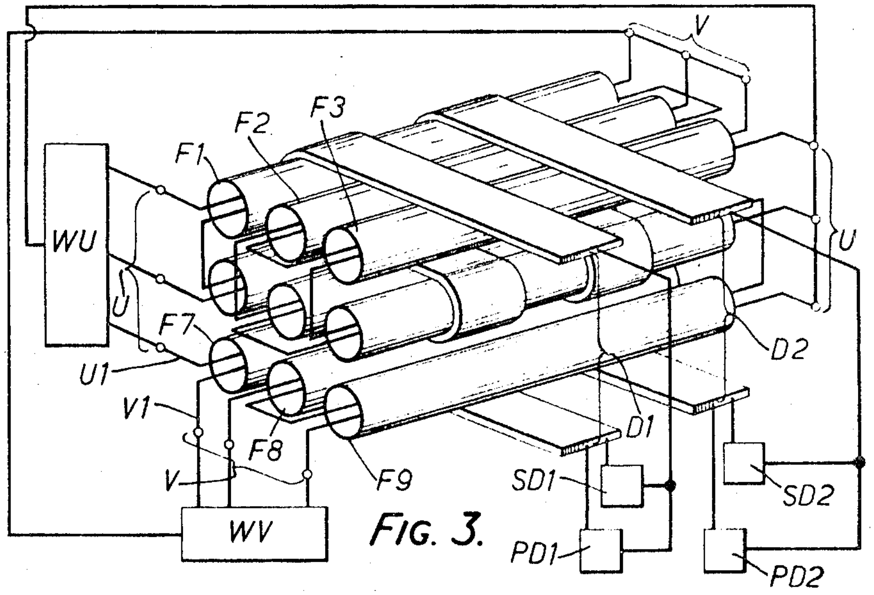
FIGURE 3 is a diagrammatic perspective view of magnetic storage apparatus of a "two co-ordinate organised" arrangement according to the present invention.

In FIGURE 3, block WU indicates means for applying energising currents to the "word" conductors U, block WV indicates means for applying energising currents to "word" conductors V, blocks SD1 and SD2 respectively indicate means for sending currents induced in the digit conductors D1 and D2, and blocks PD1 and PD2 respectively indicate means for applying energising currents to the digit conductors D1 and D2.

Before describing the orientation of the "digit" conductors and the operation of the arrangement with reference to FIGURES 4 to 7, it is convenient at this juncture to mention that the cylindrical film elements F1 to F9 may conveniently be formed by the deposition of magnetic material, such as nickel-iron alloy, on to a hollow cylindrical former or substrate of glass for instance. The deposition may be effected by the evaporation of the magnetic material on to the outer cylindrical surface of the substrate or, if the substrate is itself made of electrically conductive material the magnetic material may be electroplated on to the former. Yet another method of depositing the magnetic material on to a former of non-conductive material resides in the chemical deposition of isotropic alloys of nickel-cobalt-phosphorous. Although in the particular example taken, the cylindrical film elements are hollow and threaded by "word" conductors other constructions are contemplated. For instance, it may be possible to use as one of the "word" conductors, a conductive former or substrate (e.g. of copper) on which the magnetic material is deposited.

The "digit" conductors, only two of which are shown in FIGURE 3 primarily for clarity, are disposed orthogonally relatively to the axes of the cylindrical films F1 to F9 with each digit conductor linking each of the cylindrical films. Consequently, currents in the "word" conductors threading the films will set up circumferential magnetising fields in the films whereas currents flowing in the digit conductors D1 and D2 will set up magnetising fields in the axial directions of the cylindrical films.

It may here be mentioned that the circumferential magnetisation of the cylindrical films by which binary data can be stored in the latter may define a closed flux path. In this event, the de-magnetising effect of free poles is avoided. This advantage can enable the dimensions of the cylindrical film to be smaller than they might otherwise be thus contributing to a smaller and more compact apparatus.

From the description thus far it will be appreciated that the remanent states of magnetisation or stored digits will be distributed along each of the cylindrical films F1 to F9 to correspond to a stored "word" content. In the present example each cylindrical film can store two digits.

It will be understood that since the digit conductors, when energised, set up axial magnetising fields, the manner of control exercised by current applied to the digit conductors during writing in must, of necessity, be different from that employed in the FIGURE 1 arrangement. In this connection and also in relation to the reading out operation reference will now be made to FIGURES 4 to 7 of the accompanying drawings.

To achieve control by the digit current the cylindrical magnetic films are composed of isotropic material exhibiting a rectangular hysteresis loop. De-magnetising factors in both the circumferential and axial directions of the cylindrical films must necessarily be small so that the rectangularity of the hysteresis loop is not degraded. As already mentioned the demagnetising factor in the circumferential direction can be nullified by arranging that the magnetisation defines a closed circumferential flux path. In order to minimise de-magnetisation in the axial direction the dimension of the digit conductors in the axial direction of the film (i.e. width of conductors) is preferably arranged to be large compared with the thickness of the cylindrical film.

Figures 4, 5, 6, 7:
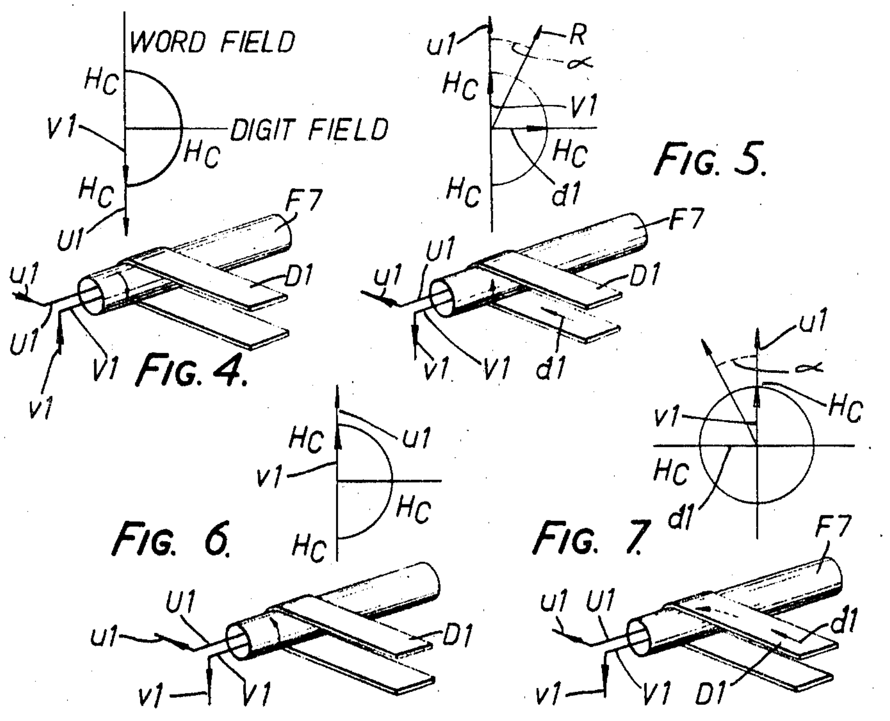
FIGURES 4 to 7 depict various detail arrangements for writing information into and reading information out of the apparatus shown in FIGURE 3.

Referring now to FIGURE 4 of the drawings, it can be seen that the currents $u1$ and $v1$ which are passed through the word conductors U1, V1 say, to achieve read out of information stored in the cylindrical film F7 are of the same magnitude and direction so that in the region where the two currents coincide within the cylindrical film F7 a circumferential field is generated which exceeds the coercivity of the material of the film and the film is magnetised circumferentially in a clockwise direction as viewed in the figure. The absence or presence of an output from the digit conductor will determine the digit stored. Alternatively, outputs of different senses may be produced. Referring now to FIGURE 5 of the drawings which shows the manner of writing control it will be seen that to write digit "1" into the cylindrical film F7 that currents $u1$ and $v1$ in the conductors U1 and V1 are both reversed relatively to the FIGURE 4 read arrangement, and a digit current $d1$ is provided so that the resultant magnetisation of the film F7 is rotated in the clockwise direction by an angle $+\alpha$. The magnetisation can remain in equilibrium in this direction since the material is isotropic and can be magnetised with equal ease in all directions. The digit current $d1$ by itself is of such a magnitude that it cannot itself produce a field exceeding the coercivity of the film material. Moreover, since the material is isotropic, the coercivity will be the same in all directions and FIGURE 5 shows the coercivity field level Hc relative to a circumferentially and axially applied field. As can be seen from the field diagrams of FIGURES 4 to 7, none of the currents $u1$, $v1$ and $d1$ alone exceed the coercivity of the material but the two word currents $u1$ and $v1$ taken together can exceed the coercivity and produce a circumferential field. The presence of the digit current D1 in coincidence with the two word currents produces the tilted direction of magnetisation. Since the read out currents produce a clockwise circumferential magnetisation of the film (see FIGURE 4) a change from the tilt condition (stored digit "1") to this condition gives rise to a change in magnetisation in the axial direction and this in turn produces a voltage output in the digit conductor for indicating digit content of the film.

In order to write digit "0" into the cylindrical film F7 one of the two following methods may be adopted. Firstly, as depicted in FIGURE 6 the digit current $d1$ may be omitted so that the magnetisation will align circumferentially in an anticlockwise direction as indicated. Since, in this state of the film there is no component of magnetisation in the axial direction when the read out currents are applied (see FIGURE 4) no output voltage will be generated in the digit conductor D1.

Referring lastly to FIGURE 7 an alternative method of writing digit "0" into the store calls for a digit current $d1$ in the digit conductor which flows in the opposite direction to that required to write digit "1" into the store. The digit "0" state is then represented by an anti-clockwise rotation of magnetisation through angle $-\alpha$. Reading of this state would induce a voltage output of opposite polarity to the digit "1" signal. This difference in polarity could then serve to identify the two binary conditions.

From the foregoing it will be appreciated that storage apparatus according to the invention facilitates the provision of a small and compact easily assembled magnetic storage arrangement. As is well-known, the "two co-ordinate organised" system of storage already has particular advantages as regards economy of selecting switches for selecting "words" over the so-called "word organised" system in the case where the number of "words" to be stored is high (e.g. in excess of $10^3$). The use of thin film elements, however, enables further advantages to be achieved in arrangements where high speed operation is required. It may be required to operate at less than 5 microseconds cycle time in a system catering for more than $10^4$ words, and if ferrite cores were employed as the storage elements the cores would need to be less than 0.02 inch in diameter and each of these would need to be assembled with associated conductors individually. This presents a considerable problem which is at least alleviated by the use of cylindrical film elements as described.

What I claim is:

1. Magnetic storage apparatus comprising a plurality of magnetic storage elements each including a tubular film of isotropic, rectangular hysteresis loop material, an array of rows and columns of said tubular films, a set of first conductors, one associated with each row of tubular films and extending lengthwise through the interiors of the tubular films of said row so that energisation of a first conductor produces in the films of the respective row a circumferential magnetising field, a set of second conductors, one associated with each column of tubular films and extending lengthwise through the interiors of the tubular films of said column so that energisation of a second conductor produces in the films of the respective column a circumferential magnetising field, and a set of third conductors each having a portion in close proximity to the exterior of each tubular film and lying orthogonally with respect to the first and second conductors associated with that film, and said third conductors being spaced apart lengthwise of said tubular films, so that energisation of a third conductor produces in each tubular film a magnetising field in a direction lengthwise of said tubular film.

2. A circuit arrangement embodying apparatus according to claim 1 and comprising means for applying energising currents selectively to one conductor of each of said sets of first and second conductors, such that each energising current sets up a circumferential magnetising field in an associated tubular film which is insufficient to overcome the coercivity of the respective film, whilst the coincidence of energising currents in the same direction in the first and second conductors associated with any one tubular film sets up a circumferential magnetising field in said film which is sufficient to overcome the coercivity of said film.

3. A circuit arrangement according to claim 2 comprising means for deriving currents induced in said set of third conductors in response to energising currents applied to one conductor of each of said sets of first and second conductors.

4. A circuit arrangement according to claim 2 comprising means for applying energising currents to said set of third conductors, such that said energising currents applied to the third conductors set up magnetising fields in said tubular film which are insufficient to overcome the coercivity of said films, but in the event that the first and second conductors associated with a tubular film are coincidentally energised in the same direction to set up a circumferential magnetising field which overcomes the coercivity of said film, the coincident energisation of a third conductor causes the magnetisation of said film due to said circumferential magnetising field to be angularly displaced in a sense dependent upon the relative senses of the energising currents.

References Cited

UNITED STATES PATENTS

| | | | |
|---|---|---|---|
| 3,221,312 | 11/1965 | MacLachlan -------- | 340—174 |
| 3,264,619 | 8/1966 | Riseman et al. ------ | 340—174 |

OTHER REFERENCES

IBM Tech. Disclosure Bull., vol. 6, No. 6, November 1963, pp. 55 and 56.

BERNARD KONICK, Primary Examiner

S. POKOTILOW, Assistant Examiner